United States Patent [19]

Lagana' et al.

[11] Patent Number: 4,915,841
[45] Date of Patent: Apr. 10, 1990

[54] PROCESS FOR THE BIOLOGICAL PURIFICATION OF WASTE WATERS

[75] Inventors: Vincenzo Lagana', Milan; Angiolo Farneti; Angelo Bassetti, both of Fano, all of Italy

[73] Assignee: Snamprogetti, S.p.A., Milan, Italy

[21] Appl. No.: 220,077

[22] Filed: Jul. 18, 1988

[30] Foreign Application Priority Data

Aug. 7, 1987 [IT] Italy ................ 21618 A/87

[51] Int. Cl.$^4$ .............................................. C02F 3/30
[52] U.S. Cl. .................... 210/605; 210/615; 210/617; 210/622; 210/623
[58] Field of Search ............... 210/601, 605, 615, 677, 210/622, 623

[56] References Cited

U.S. PATENT DOCUMENTS

| | | | |
|---|---|---|---|
| 936,464 | 10/1909 | Lucas | 210/605 |
| 978,889 | 12/1910 | Imhoff | 210/601 |
| 3,112,261 | 11/1963 | Porter et al. | 210/615 |
| 3,293,174 | 12/1966 | Robjohns | 210/617 |
| 4,344,848 | 8/1982 | Hukulinen | 210/617 |
| 4,366,059 | 12/1982 | Witt et al. | 210/615 |
| 4,627,917 | 12/1986 | Morper | 210/617 |
| 4,743,376 | 5/1988 | Elmuleh et al. | 210/617 |

FOREIGN PATENT DOCUMENTS

| | | |
|---|---|---|
| 6048194 | 8/1983 | Japan . |
| 60-12195 | 1/1985 | Japan . |
| 60-38094 | 2/1985 | Japan . |
| 60-54791 | 3/1985 | Japan . |
| 62-279898 | 12/1987 | Japan . |
| 8202983 | 7/1982 | Netherlands . |

Primary Examiner—Richard V. Fisher
Assistant Examiner—Christopher Upton
Attorney, Agent, or Firm—Hedman, Gibson, Costigan & Hoare

[57] ABSTRACT

Process for the psychrophilic biological purification of waste waters having medium-low concentrations of polluting substances. The process comprises a first anaerobic treatment step with an expanded mud bed of U.A.S.B. type at a low flow rate, a second treatment step comprising a fluid-bed treatment on a fine support at a high flow rate, and a final treatment step comprising anaerobic treatment for the nitrification and oxydation of the various substances reduced in the previous treatments. The flow is then recycled to the upstream steps for the removal of possible nutrients, such as nitrogen and phosphorus.

13 Claims, 1 Drawing Sheet

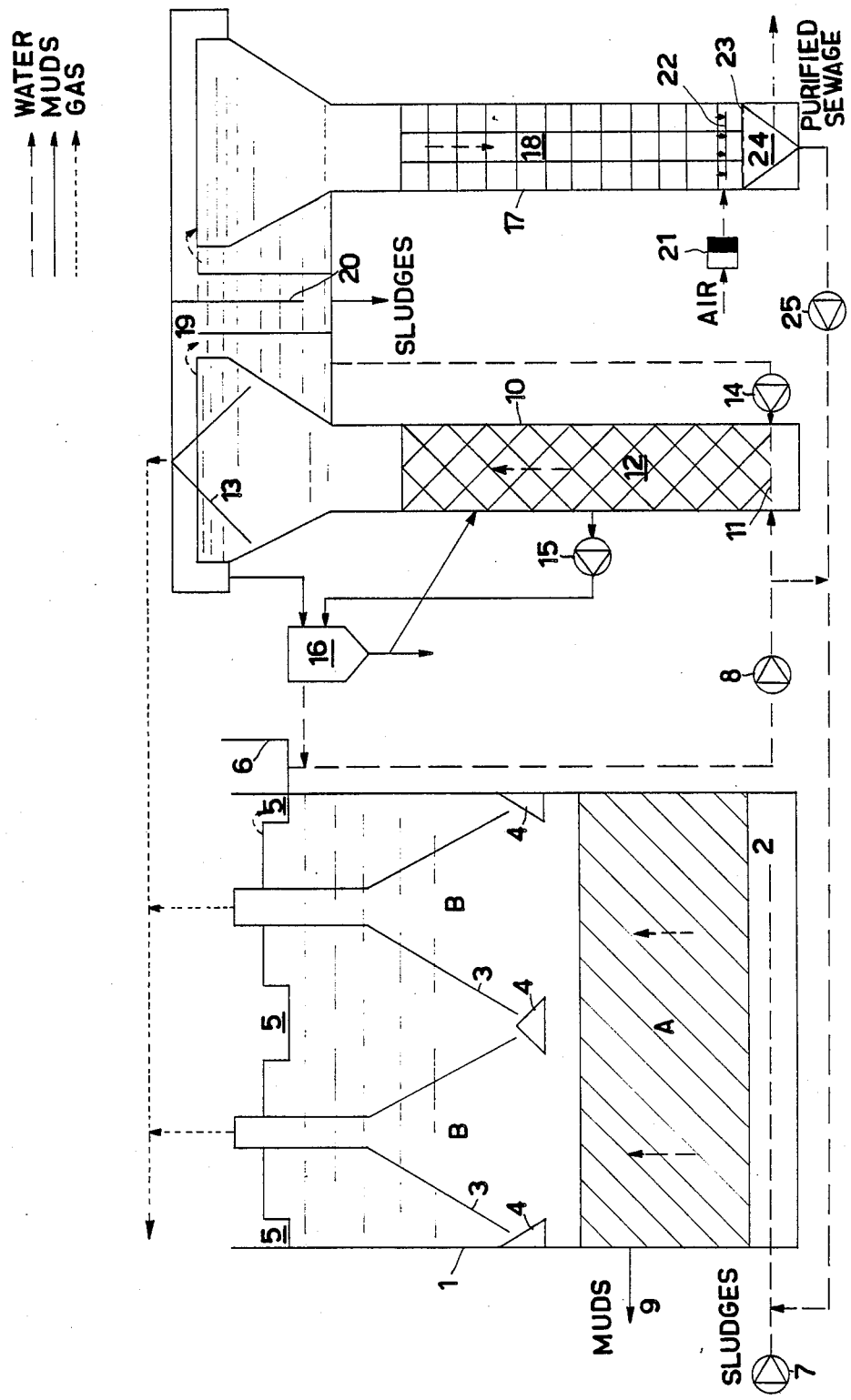

PROCESS FOR THE BIOLOGICAL PURIFICATION OF WASTE WATERS

FIELD OF THE INVENTION

The object of the present invention is a biological treatment process for the purification of waste waters of both urban and industrial origin. The treated waste water has low concentrations of organic and inorganic polluting substances and eutrophy-causing nutrient substances. This results in limited amounts of muds having an acceptable quality, and a treated sewage complying with the regulations and low in eutrophy-causing substances being discharged into the environment.

DESCRIPTION OF THE PRIOR ART

The conventional processes of biological treatment are substantially aerobic using activated sludges.

After the pretreatment processes of coarse filtration, sand removal, oil removal and primary settling, the aerobic biological treatment ability of a is based on the ability of a aerobic degradation by a mixed microbial biomass of the polluting substances, using them to obtain energy for its metabolic processes, and to obtain elements (C, H, O, N, P) to multiply, with the consequent production of newly-formed muds.

Aerobic biological treatment makes the suspended and dissolved organic substances, as well as a portion of nitrogen and phosphorus to be removed from the treated effluent. As a consequence, a large amount of muds are produced which along with the generated fermentable biomass, also contains infesting seeds, pathogen organisms and parasites, and heavy metals.

The aerobic biological process transfers the pollution from sewage to mud which, as such, cannot be correctly disposed of.

For the agronomic use or for a correct end disposal of such muds, further treatments of stabilization, hygienization or sterilization and dehydration are necessary, which require high investment costs and considerable operating costs.

So-treated water still contains large amounts of phosphorus, which is the determining element eutrophying waters.

For the nearly total removal of phosphorus, it is necessary to resort to the addition of further additives, which further increase the production of muds which require disposal.

According to conventional aerobic processes, approximately 50% of the organic carbon contained in the waste waters is converted into carbon dioxide, and the residual 50% is converted into newly-formed biomass, which remains in the muds for disposal.

SUMMARY OF THE INVENTION

The process of biological treatment according to the present invention makes possible urban and/or industrial waste waters to be treated, with the reduction of the above mentioned drawbacks affecting the conventional processes aerobic treatment.

It will be disclosed by referring to hereto attached FIG. 1, which shows a typical practical embodiment thereof.

The process according to the present invention is constituted by an anaerobic, anoxic biological treatment process. Using specific microorganisms which reduce both the organic compounds and recycled nitrites and nitrates, and produce a biogas prevailingly constituted by methane, and including nitrogen and carbon dioxide. By following this with oxidating aerobic biological treatment on inert supports at a high speed, ammonia is nitrified, and the sulphides and sulphites are oxidated.

DESCRIPTION OF THE PREFERRED EMBODIMENT

According to a preferred form of practical embodiment, the process is subdivided into the three following treatment steps:

(a) an initial anaerobic/anoxic biological treatment on an expanded mud bed (hydrolytic/acidogen step);
(b) a finishing anaerobic biological step on a fluid bed with a fine support (acetogen/methanogen step);
(c) an aerobic treatment for the nitification and the end oxydation of the various substances reduced during the preceding steps.

Such treatment steps are now separately described after the conventional preparation of filtration, sand removal and oil removal.

The (a) step replaces the traditional primary settling of the solids carried out in the conventional treatment facilities.

In this step, by means of an anaerobic/anoxic biological reaction on an expanded mud bed of U.A.S.B. (acronym for Upflow Anaerobic Sludge Blanket), settling, thickening psychrophilic stabilization of heavy muds rich in phosphorus, solubilization (biolysis), biological removal of the organic substances and of nitrates are simultaneously carried out. Also produced are a partially purified liquid effluent, a small amount of muds, stabilized with a high concentration of dry matter, and a biogas with a high heat power.

The reactor 1 inside which the first reaction step is carried out is substantially constituted by a tank with a preferably rectangular cross-section. This is equipped with a system 2 for the regular distribution of the stream of the waste waters to be treated in the bottom area, e.g., with a set of parallel pipes at regular distances. It is provided with perforations along is lower generatrices.

In the upper portion of the tank a device 3 is installed, which is used to collect the biogas generated by the anaerobic reaction. It can be constituted, e.g., by one or more metal biogas-collecting caps, which in correspondence of their lower edges are supported by supports 4, with which they form a labyrinth seal (not shown in the figure), which enables the sludge, but not the gas phase, to flow through.

At the top of the reactor a spillway device 5 is installed, which is constituted, e.g., by channels leading to the sump 6.

The reactor 1 is fed through the distributor 2 with the sewage to be treated and delivered by means of the punp 7, and with the recycled matter coming from downstream equipment.

According to a different form of practical embodiment, the feed can be carried out by gravity.

Inside the reactor 1 two regions are established: a lower (A) region occupied by the bed of expanded mud (U.A.S.B. or biolytic region), wherein the above described anaerobic/anoxic reaction takes place, and the upper (B) region, wherein the separation by settling between the mud and the clarified liquid takes place.

The reaction proceeds at room temperature and the mud bed is maintained expanded by means of a flow rate distributed by the distributor 2, which maintains an upwards speed through the cross section of 1 comprised within the range of from 0.1 to 0.5 m/hour, and preferably of from 0.2 to 0.4 m/hour (including the recycled streams).

The average residence time of the fed sewage distributed by means of 2 is within the range of from 5 to 20 hours, according to the concentration and the temperature of the sewage, and preferably from 8 to 16 hours.

Inasmuch as the charge fed to the treatment facility is not constant over time, but depends on the upstream users, it may show wide oscillations as occurs in the case of urban wastes-yet the fluid-dynamic steady state is ensured by the recycle flow rates.

Inside the reactor 1 there is an expanded mud bed at a high concentration, more then 10 times higher than the concentration of the conventional active-sludge aerobic processes.

As a consequence thereof, in the layer of anaerobic mud a high ratio of the disposal yield to volume can be obtained. This makes possible a volumetric charge of the order of 1 kg of $COD/m^3$.day to be adopted in the expanded mud bed, with a hydraulic stay time of the order of 10 hours, and an age of the digestion mud older than 2-3 months. Under such operating conditions, more than 50% of volatile suspended solid matter is removed from the sewage, and a growth of biomass by degradation of the soluble organic substances less than 0.1 kg of dry matter per kg of removed COD is obtained.

Inside this bioreactor, the preliminary denitrification is simultaneously achieved, by using the organic substances contained in the raw sewage as the carbon and energy source for the specific microorganisms. These microorganisms reduce nitrites and nitrates, which are supplied by the recycle streams, to gaseous nitrogen compounds. Thus the effect of an integrated biological pre-denitrification is obtained, with a portion of the mixture nitrified in the final aerobic step which is recycled back to the initial anoxic step.

The biological stress to which the biological muds recycled in the anaerobic section are submitted, determines a partial release of phosphorus. This is subsequently assimilated in excess, and accumulated in the muds of the final aerobic step, with removals reaching values as high as 90%.

From the reactor 1, the following streams are taken: a stream of clarified liquid by means of the spillways 5, the sump 6 and the pump 8 which feeds both the subsequent (b) step and the recycle stream to reactor 1, and a stream of muds, which is discharged in 9. As already mentioned, such muds result much more concentrated and in considerably reduced amounts (by $\frac{1}{4}-\frac{1}{2}$) as compared to those which can be obtained by means of the conventional aerobic treatments.

The (b) step constitutes a finishing anaerobic biological treatment process at room temperature on a bed filled with a fine support, for the final removal of the polluting organic substances.

Such a reaction is preferably carried out on a bed kept fluidized, with high recycle rates, and an upwards flow, wherein inert materials of small-size particles—e.g., quartz sand, silicates, granular coal, sepiolite, glass, plastic material or ceramic material of suitable particle size—are used as a support for a microbial biofilm. Such a film removes the polluting substances (volatile acids) under anaerobic condizions, i.e., in the absence of oxygen, with a further amount of biogas rich in methane being obtained.

Referring to FIG. 1, the inside of the reactor 10, is equipped with a perforated plate 11, or with an equivalent device which supports the bed 12 for distributing the upwards stream inside its interior.

Above the fluidized bed 12 is an enlarged "C" area of clarification and a device 13 for collecting the biogas produced-which is analogous to caps 3.

Inside the reactor 10 a high upwards speed and a high contact efficiency are maintained, with organic charges of the order of 5-10 kg of $COD/m^3$.day. The rising speeds are comprised within the range of from 5 to 75 m/hour, maintained at a high values by recycling large amounts of treated water by the punp 14. The recycle/feed ratios comprised within the range of from 4/1 to 8/1, and, together with a limited production of muds, smaller than 0.2 kg of dry matter per kg of removed COD, a purified effluent is obtained. The reduced nitrogen compounds (as well as reduced sulphur compounds) are still present.

According to another form of practical embodiment, the finishing anaerobic biological treatment can also be carried out, with the same fluid-dynamic steady-state conditions as above disclosed being maintained, by a downwards flow, and using a floating packing material, e.g., a small-size spongy material, pumice granulate, or the like.

In the long term, the production of further muds— even if in small amounts—could decrease the efficiency of the treatment due to the clogging of the support bed. Such a mud can be removed from the support by means of centrifugal separators, or by gravity. For exemplifying purposes, in the practical embodiment depicted in FIG. 1, and referring to the use of sand as the inert material, such a separation is carried out by continuously drawing, at one or more levels of the bed 12, by means of pumps 15, a small amount of the suspension. It is then delivered to a settling basin 16, which is substantially constituted by a cyclone, from whose bottom section the sand-which is heavier, and deprived of mud—is extracted. It is then recycled to the bed 12, whilst the mud remains in suspension, and leaves the settling basin from the top and either recycled to the reactor 1, or discharged.

The hydraulic residence times inside the reactor 10 are very short, and are within the range of from approximately 10 minutes to approximately one hour.

The (c) step is constituted by aerobic treatment for denitrification and final oxidation of the various substances reduced in the preceding steps.

In the event of low polluting charges, the (b) step may not be necessary, and can be omitted, and the effluent treated which is in the (a) step sent directly to the (c) step.

From said (c) step, a portion of the generated purified sewage and muds are recycled to the preceding steps for denitrification and phosphorus removal by biological processes.

The final aerobic step requires very short contact times, and is carried out on a biological bed, preferably fixed and with a liquid stream flowing downwards countercurrent to the air. The air is supplied from the bottom, either naturally (percolator), or forced (submerged filter).

Such a biological bed has inert supports—expanded clay, plastic materials, gravel, ceramic materials—having a rather large size, to which chemoautotrophic organisms adhere. These organisms carry out nitrification of ammonia and the oxidation of the sulphides, with dissolved oxygen concentrations higher than 2 mg/l.

The nitrified effluent, containing a small amount of muds, is recycled to the preceding anaerobic/anoxic steps, and the purified and clarified effluent is sent to the discharge, without any secondary settlings.

According to the form of practical embodiment depicted in FIG. 1, the (c) step of aerobic treatment is carried out inside the reactor 17 which is occupied by the bed 18.

The clarified water coming from the reactor 10 flows from its upper spillways 19 through the separator 20, and comes to the top of the reactor 17. It then flows downwards through said reactor in an aerobic environment, by a flow of compressed air which is delivered by the compressor 21 and distributed by means of the diffusers 22 at a rate of from 5 to 20 m$^3$/hour per m$^3$ of bed 18.

The bed 18 is supported by a support 23, e.g., a perforated-plate support.

In the bottom region 24 separation is achieved between the residual muds and the purified and clarified sewage, which is discharged, whilst the suspension of the muds is recycled by means of the pump 25 to the reactor 1.

On the contrary, the reactor 17 has the structure of a percolator, and the treatment air flows through it by natural draft.

The process according to the present invention offers considerable advantages over the conventional processes of aerobic treatment. Among them, the following are worth being mentioned:
 the sharp decrease in energy consumptions, which are more than halved;
 the reduction in mud production, which are more stabilized and concentrated, and are hence easier to dispose of;
 the reduction in facility surface area;
 the production of high-heat-power biogas, at a rate of approximately 90% of carbon present in treated sewage.

The process according to the invention can be furthermore implemented in a simplified form when the waste waters to be processed contain reduced amounts of pollutants and nutrient substances. Both the initial and the finishing anaerobic steps can be unified into one single, suitably adapted, anaerobic treatment step, of either type, preceded by a conventional settling treatment, or just by a microfiltration step.

EXAMPLE

The above disclosed process was tested on a 1:1 scale by means of a demonstration facility of 1000–1500 equivalent inhabitants, in order to purify at room temperature a portion of the urban sewage generated by the town of Senigallia.

The daily volume of sewage, was continuously treated and comprised within the range of from approximately 200 m$^3$ to approximately 400 m$^3$, as a function of the pollutant loading. This comprised from a minimum value of 80 kg of COD/day, up to a maximum of approximately 250 kg of COD/day. The campaign was carried out from September 1987 until April 1988.

The sewage entering the facility had the polluting characteristics as reported in Table 1, whilst at the end discharge, the purified sewage has an acceptable composition according to Table A Italian Law 319/1976 and following modifications and integrations, as reported in Table 2.

TABLE 1

| CHARACTERISTICS OF ENTERING SEWAGE | | | | |
|---|---|---|---|---|
| | | Average Value (8 months) | Minimum Value | Maximum Value |
| COD | mg/l | 350 | 200 | 630 |
| BOD5 | mg/l | 140 | 80 | 240 |
| SST* | mg/l | 160 | 65 | 710 |
| SSV** | mg/l | 120 | 60 | 360 |
| TKN*** | mg/l | 40 | 15 | 80 |
| Total P | mg/l | 6 | 4 | 8 |
| SO$_4$= | mg/l | 90 | 30 | 275 |

*Total suspended solids
**Volatile suspended solids
***Total organic ammonia nitrogen

TABLE 2

| "A" TABLE LAW 319-1976 | | | |
|---|---|---|---|
| COD | mg/l | 160 | |
| BOD5 | mg/l | 40 | |
| SST | mg/l | 80 | |
| Settling solids | mg/l | 0.5 | |
| H$_2$S | mg/l | 1 | |
| SO$_3$= | mg/l | 1 | |
| SO$_4$= | mg/l | 1,000 | |
| Total P | mg/l | 10 | (0.5 in lakes) |
| NH$_4$+ | mg/l | 15 | (10 in lakes) |
| N—NO$_2$− | mg/l | 0.6 | (10 in lakes) |
| N—NO$_3$− | mg/l | 20 | (10 in lakes) |

Such results were obtained by means of a facility according to the the diagram shown in FIG. 1, preceded by a treatment of microfiltration to 0.5 mm, having the following characteristics.

The reactor 1 is constituted by a concrete basin of square cross-section, with a capacity of 336 m$^3$ and a total useful height of 7 meters.

Of such volume, 236 m$^3$, corresponding to a height of 5 m, is occupied by the bed of expanded mud which constitutes the space destined for the initial anaerobic reaction.

The residual volume above it, of approximately 100 m$^3$, is destined for the clarification of the liquid.

From the above reported data, one can already observe that such an initial anaerobic reaction proceeds with an average charge of approximately 1 kg of COD/day per m$^3$ of reaction volume, which is a considerably high value.

The ratio of the charge of sewage to the recycled streams from the downstream sections was at maximum of approximately 1:1.

The stream distribution system 2 installed at the bottom of the reactor 1 is constituted by a toroidal pipe from which 8 horizontal pipes branch off, which are provided with 6—mm bores oriented downwards.

The spillway system 5 is constituted by channels with a Thomson weir profile.

The mud level and mud concentration monitoring system inside the reactor 1 controls the flow rate distributed by 2, and the discharge of muds through 9.

The biogas collecting system is constituted by 2 metal caps.

The subsequent reactor 10 was fed, during the experimental run, with only 50% of effluent from reactor 1, whilst the residual 50% of such effluent was directly sent to the end step. The reactor 10 is constituted by a vertical metal cylinder with an inner diameter of 1,200 mm, and with a useful volume of approximately 8 m$^3$, containing 3 m³ of stationary sand, surmounted by a settling area with an enlarged cross-section for the clarification, as well as by a cap of metal sheet for collecting the biogas, and by a Thomson-profile weir.

A circular settling basin 16 of 300 liters enables the dump muds to be separated from the sand, which is recycled.

During the test, inside the reactor 10 a recycled streams/feed stream ratio of from 5:1 to 10:1, and a rising speed of from 20 to 55 m/hour was maintained.

Inside the reactor 17, having a shape and dimensions substantially equal to reactor 10, air was fed by means of a lobe blower, whose delivery rate was of 10 m³ of air per each m³ of bed 18 per hour.

No counter-washes were necessary.

The ratio between the stream recycled by the pump 25, and the discharged purified sewage was within the range of from 1:1 to 4:1.

The bed 18 operates as a submerged filter and is constituted by 1-inch PVC supports, with a surface area of 230 m²/m³.

The average overall production of muds was of 0.14 kg of total solids per each kg of supplied COD, with a concentration of 7–10% of dry matter, constituted by approximately 50% of organic substances.

As regards the energy consumption, the process requires 0.16 kWh per each treated m³.

The traditional aerobic treatments produce, with the other conditions being the same, amounts of muds which are from three- to four-fold larger, with less than half the concentration of solids, which contain a concentration of putrescible organic substances of 60–70% of the dry matter.

Their energy content results approximately double.

We claim:

1. A process for purifying by biological treatment a wastewater flow having feed streams and recycle streams and conducted at approximately ambient temperature, comprising:
    (a) treating the wastewater flow in an upflow anaerobic sludge blanket by means of an expanded mud bed anerobic/anoxic biological process comprising a thick bed of expanded mud and an overlying zone separating the wastewater flow into water and mud wherein the combination of feed streams and recycle streams maintain an upward speed comprising the range of from about 0.1 to 0.5 m/hr, the flow to said expanded mud bed comprises volumetric values of about 1 kg of COD per cubic meter per day, and the wastewater flow has a residence time of from about 5 to about 20 hours;
    (b) treating the flow from said upflow anaerobic sludge blanket by means of an anaerobic biological process having fine inert support media, wherein said anaerobic biological process comprises a fluidized bed; and
    (c) nitrifying and oxidizing the flow from said anaerobic biological process having fine inert support media in an aerobic biological process by means of a treatment air flow through a fixed bed.

2. The process of claim 1 wherein said upflow anaerobic sludge blanket is in place of a primary settling step in the biological treatment of wastewater.

3. The process of claims 1 or 2 wherein said upward speed comprises the range of from about 0.2 to about 0.4 m/hr.

4. The process of claims 1 or 2 wherein said residence time comprises the range of from about 8 to about 16 hours.

5. The process of claims 1 or 2 wherein the wastewater flow to said fixed bed of said aerobic biological process is downward and countercurrent to a flow of blown air and comprises concentrations of dissolved oxygen greater than about 2 mg/l.

6. The process of claim 5 wherein the wastewater flow to said fixed bed has a residence time of about 1 hour.

7. The process of claims 1 or 2 wherein said biological treatment of said aerobic biological process is by means of a fixed bed percolator and said treatment air circulates by natural draft.

8. The process of claims 1 or 2 wherein a first portion of the flow from said fixed bed is discharged after a preliminary clarification and a second portion of the flow from said fixed bed is recycled to said upflow anaerobic sludge blanket wherein the ratio of said first portion to said second portion comprises the range of from 1 to 4.

9. The process of claim 2 wherein said fine support media of said anaerobic biological process is fluidized by means of high upflow speeds comprising from about 15 to about 55 m/hr with said upflow further comprising high ratios of said recycle streams to said feed streams wherein said high ratios comprise from about 4:1 to about 8:1.

10. The process of claim 9 wherein a produced mud is removed from said fine inert support media by means of centrifugal separators or gravity.

11. The process of claim 9 wherein the wastewater flow to said anaerobic biological process having fine inert support media has a residence time of less than 1 hour.

12. The process of claim 9 wherein the wastewater flow to said anaerobic biological process having fine inert support media has about 5 to about 10 kg. of COD per day per M³ of fluidized bed.

13. The process of claim 2 wherein said anaerobic biological process having fine inert support media further includes floating packing material and comprises a downward flow of the wastewater in a fluid dynamic steady state at speeds comprising from 15 to 55 m/hr and high ratios of said recycle streams to said feed streams wherein said high ratios comprise from 4:1 to 8:1.

* * * * *